Nov. 26, 1935.  A. L. BARNES  2,022,454
MONOCULAR PHOTOGRAPHIC APPARATUS
Filed Jan. 31, 1934
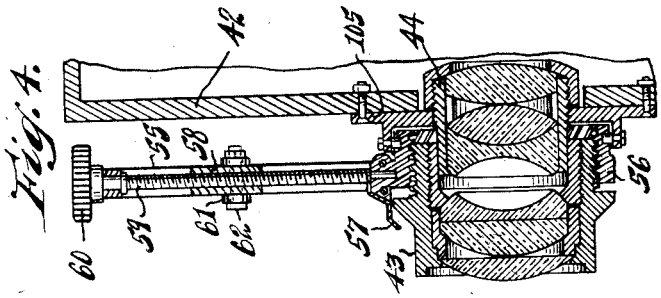
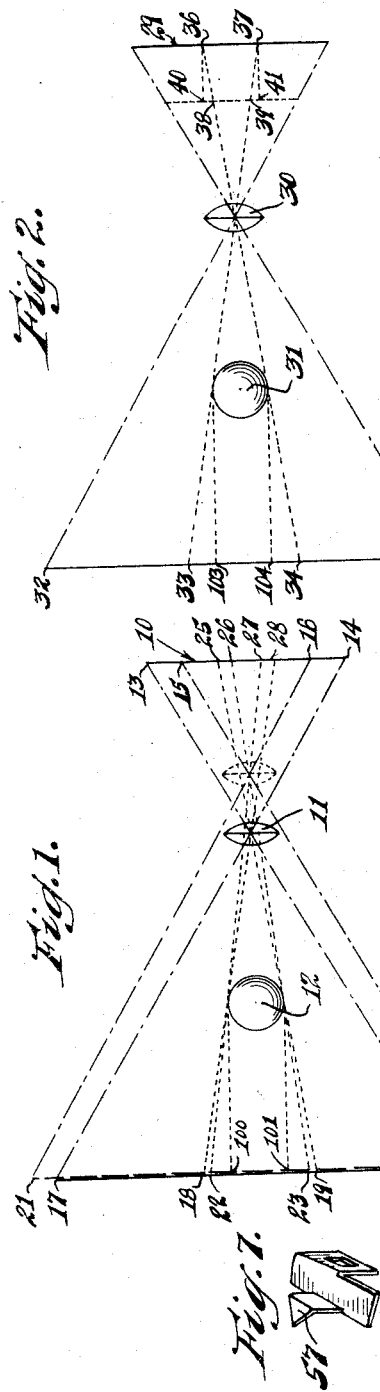
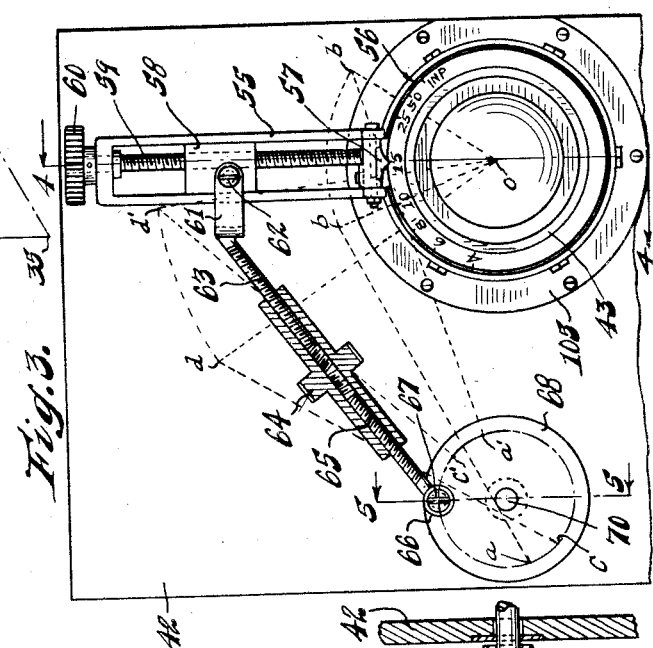
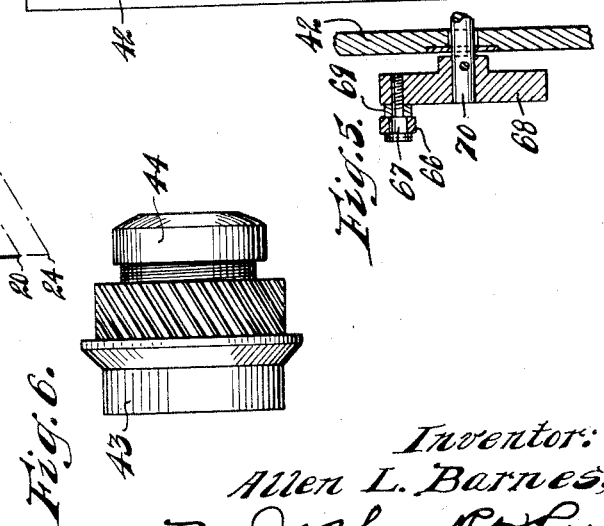
Witnesses:
E. E. Wessels
Aasta E. Matson
Inventor:
Allen L. Barnes,
By Joshua R. H. Potts
his Attorney.

Patented Nov. 26, 1935

2,022,454

UNITED STATES PATENT OFFICE 2,022,454

MONOCULAR PHOTOGRAPHIC APPARATUS

Allen L. Barnes, Oak Park, Ill., assignor, by direct and mesne assignments, to Joseph H. Hinshaw, trustee, Wilmette, Ill.

Application January 31, 1934, Serial No. 709,185

3 Claims. (Cl. 88—16.6)

My invention relates to monocular photographic apparatus and the recording of pictures upon a motion picture film in such manner that when they are projected upon an observation screen and viewed they appear to possess depth or third dimension and a realistic appearance unattained in the various binocular stereoscopic pictures which have heretofore been used.

My method and apparatus apply strictly to the monocular system of photography as comparable to monocular vision. However, my method and apparatus bear the same relation to binocular photography as does monocular vision to binocular vision.

Each of the two monocular systems comprising a binocular system are susceptive of my monocular depth or third dimension methods and apparatus and if employed in connection with the present binocular stereoscopic systems of photography the unnatural appearance of the stereoscopic pictures disappears and the result is a picture with all the realness of natural vision, a result never before attained in depth pictures and when combined with a three color process produces all that can ever be asked for in motion pictures.

My method and apparatus for producing depth or third dimension pictures are not only monocular in the photographic lens system but also monocular in the effective view point and are not to be confused with the monocular photographic means and methods which alternate between two or more view points in taking a series of pictures and which require a shifting of the camera or lens laterally, which system is in reality a substitute for a binocular system.

My chief object in this patent is to produce a series of pictures framed upon a single continuous motion picture film and taken through a single monocular lens system from effectively the same view point and without lateral shifting of the camera between pictures by employing such means and methods so that the pictures so produced when projected upon an observation screen by the present projectors will appear quasi depth or third dimension and with an appearance of depth or third dimension comparable to everyday monocular vision.

The quasi depth or third dimension effect secured through the employment of my method and means is dependent upon certain properties of vision common to the human eye being a combination of the ability of persistence of vision, the analyzation of displacement of rapid and microscopic focusing, all of which accounts for analyzing of depth, the effect of irradiation, and accidental image. Irradiation is not due to the extension of the outline of images upon the retina but is due to a change of focus and magnifying power when alternating the concentrated vision between the black and white areas.

Therefore, since the human eye possesses the ability of persistence of vision and the ability to analyze displacement and since there can be but one focus of the eye upon a fixed projection screen of two dimensions I propose to mechanically replace the focusing of the eye by taking the various frames of pictures upon the motion picture film at different focuses and rapidly exhibit them in succession corresponding to the natural focusing or change of magnifying power of the eye which would take place if the real objects were viewed.

An object of my patent is to produce pictures, comparable to natural vision, which depict the sense of depth by seeing microscopically around the edge or behind the edge of objects thus sharply defining them and setting them out in relation to their actual depth, the extent of this view behind the edge increasing with the increased distance in depth between the objects.

While a detailed description appears in the succeeding pages a brief explanation may assist in the understanding of my objects. The pictures are taken so that the various frames record the view at various focuses and for every focus there is a distance from the camera lens at which the objects appear more distinct. With every change of focus there is a change of magnification of everything in the field of view. Therefore if we depend upon the persistence of vision when viewing these records a nearby object in focus remains upon the retina or brain while a more distant focus is made and projected whereupon the nearby object is smaller and out of focus but the persistent image of the nearby object remains at the same time and this reduction of the nearby object in the second picture permits of so much of the distant field to be depicted sharply just behind the edge of the persistent image of the nearby object. The extent of this distant view behind the persistent object is relative to its relative depth location and our sense of analysis of displacement within the eye or brain interprets this in the natural way as being true depth.

This means and method of photography are applicable to all moving pictures, all color pictures of all kinds and are applicable to binocular and stereoscopic pictures, and one of my objects is to make each monocular photographic system in a binocular system a monoglyphic system as herein described in order to make such stereoscopic pictures more natural and perfect.

A further object is the overcoming of the appearance in the case of color pictures of the various colors standing out in different planes which are meant to be in the same plane. This is accomplished by giving the observer of the screen the focal depth that his eye is searching for and thereby subduing the tendency to find it in the color planes of focus.

A further object is to produce a third dimension motion picture by employing the standard motion picture camera, excepting for slight alterations, and which will take the pictures upon the customary film which can be developed in the ordinary manner; the film can be projected upon the present screen by the present projector without any alteration and yet will produce a third dimension picture upon the screen without the aid of any apparatus to be used by the observer and which he can view with both eyes in the normal manner.

A further object is to produce a picture upon the screen which can be viewed from the side seats in the theater without the usual distortion common with two dimension pictures.

It is to be understood that the drawing which is employed with this application is exaggerated in some respects for the purposes of illustration, and this is especially true of Figs. 1 and 2.

Other objects being obvious will not be mentioned.

My invention may be best understood by reference to the accompanying drawing, in which:

Fig. 1 is a geometrical diagram of an optical system for which my methods are applicable;

Fig. 2 is a geometrical diagram of a modified optical system for which my methods are applicable;

Fig. 3 is a front elevational view of a camera lens equipped with my focus altering mechanism;

Fig. 4 is a sectional view taken substantially on line 4—4 of Fig. 3;

Fig. 5 is a sectional view taken substantially on line 5—5 of Fig. 3;

Fig. 6 is a detail view of the internal mechanism commonly used in the focusing mount for a camera lens; and Fig. 7 is a perspective view of the distance indicator with its attaching member.

When taking pictures with a motion picture camera a sharp image of the subject desired must be focused upon the sensitized film. The distance of the most desirable objects from the lens determines the correct focus. These objects lay within the field of view of the camera while other objects more close or distant from the lens are not as sharply focused upon the film.

Therefore, if we choose to bring any of these other objects into sharp focus upon the film it is necessary to change the focus to their respective distance from the lens whereupon the first objects focused upon become more or less out of focus, and in order to make a series of pictures each of which occupies a frame upon the motion picture film and each of which represents a concentrated focus upon objects within the field of view which appear at different distances from the lens it becomes necessary to take each picture at a different focus and therefore after each picture is taken the focus should be changed preceding the taking of the subsequent picture.

The focus of a camera can be altered in substantially two ways; namely, by moving the sensitized photographic material toward or away from the photographic lens, and by moving the photographic lens toward or away from the sensitized photographic material, the latter alternative being the more common in the case of motion picture cameras for obvious reasons and being modified in the case of compound photographic lens consisting of a converging front component and a diverging back component in which case the focusing process consists in moving one of the components toward or away from the sensitized photographic material. This is most commonly accomplished by means of a rotary adjustable member operating in trapezoid screw threads which control one of the components of the compound lens.

Referring now to Fig. 1 a strip of sensitized photographic material 10 is arranged for receiving the focused image transmitted by lens 11 from object 12. While the lens 11 is in the position indicated in full lines in Fig. 1 the record of the breadth of the field of view 17—20 at a given distance from the film 10 will be contained upon the strip of film between the limits defined by the line 13—14 and the record of the object 12 will be contained upon the strip of film between the limits defined by the line 25—28. When the lens 11 is moved toward the film to the position indicated in the dotted lines in Fig. 1 the record of the breadth of the field of view at a given distance from the film as indicated by the line 21—24 will be contained between the limits defined by the line 15—16 and the record of the object 12 will be contained upon the strip of film between the limits defined by the line 26—27. Relative to the first mentioned location of lens 11 in solid lines it is assumed that object 12 is in correct focus and plane 17—20 is out of focus and that in the case of the second location of lens 11 in dotted lines it is assumed that the plane 21—24 is in correct focus while object 12 is out of focus. It is to be noticed that in this latter location of lens 11 that the lateral extent of the image of object 12 is reduced from 28—25 to 26—27 and the plane 21—24 is laterally more extensive than 17—20 while their image is reduced to occupy less space upon the film. This phenomena would mean nothing in photography if it were not that the eye is capable of persistence of vision and capable of interpreting the meaning of displacement and that this above described optical phenomena takes place continually within the eye during vision.

I propose to do the focusing with the camera and depend on the eye for the persistence of vision and interpretation of the displacement. It is necessary to bear this in mind in order to clearly understand the method and apparatus heretofore mentioned.

Proceeding with Fig. 1 when the camera is focused upon object 12 the image transmitted by lens 11 in its first position is 25—28 and when the plane 21—24 is in focus as when lens is in its second position as indicated in dotted lines then the object 12 is out of focus and less conspicuous and is reduced in size upon the film to line 26—27. And in the case when object 12 was in focus it projected upon plane 17—20 an extent 18—19 while in the latter case when plane 21—24 is in focus it projects upon that plane an extent 22—23. Now if the first cast image of object 12 in focus remained upon the eye due to persistence while the second image was received by the eye from the second picture with the plane 21—24 in focus then the persistent image would remain the same size regardless of what focus the next picture was made upon which it finds itself due to persistence. Hence when plane 21—24 is in focus the persistent image of object 12 occupies the space indicated on line 21—24 by the extent 100—101. Now it can be seen that in this case the portion of the field plane 18—19 representing the projected image upon the field out of focus as compared to the persistent image in focus appearing to occupy the extent of 100—101 reveals portions of field plane 18—101 and 19—101 which are in focus and in the case of the first picture made with lens in its first position was obscured by the object 12. Therefore we are made to see as it were behind the edge of objects by this method and the ability of the eyes to interpret displacement does interpret this as relative depth just as it does in vision.

Referring to Fig. 2 an analogous phenomena is experienced when the film 29 is moved toward the lens 30 and a photograph is made at the two positions of the film, the first with object 31 in focus and the latter with the field plane 32—35 in focus. In this case 36—37 represents the real image of object 31 and 40—41 the persistent image of the same while 38—39 is the less prominent out of focus image of 31 and 32—40 and 39—41 are sharply focused sections of the field plane 32—35 which appear behind the edge of the persistent image of object 31 and is represented on the field plane 32—35 by the extent 33—103 and 34—104. Therefore, it makes no difference how the focus is altered the principle is the same and while either way of changing the focus may be employed I preferably employ that explained in connection with Fig. 1. The apparatus described in connection with Figs. 3, 4, 5, 6, and 7 is adapted to follow the arrangement described in connection with Fig. 1.

Referring now to Fig. 4 a camera housing 42 is provided with the usual aperture for receiving light rays and a lens flange 105 is secured to the camera housing 42. The particular lens shown and described in connection with my invention is well known in the art and is what is commonly known as a focusing mount compound lens. Either the entire lens or the front component is movable for the purpose of changing the focus. I show the back component preferably anchored in sleeve 44. The component 43 of the lens is adapted to be moved forwardly and backwardly from the component 44 in order to change the focus. The interior movement actuating parts constitute no part of this invention and since they are familiar to those skilled in the art they will not be described in any greater detail.

Referring to Figs. 3, 4, and 5 instead of employing the short miniature focusing arm or the annular knurled focusing member employed on some types of lenses I preferably employ an elongated U-shaped arm 55 which is secured to focusing ring 56. A distance indicating pointer 57 is attached at the base of the arm 55 for the purpose of indicating the particular distance for which the lens is focused. A series of numbers indicating the distance is placed in the usual manner upon the exterior housing of the lens. Between the side members of the U-shaped arm 55 is arranged a block 58 which is threaded internally to receive an elongated screw 59 which extends through substantially the entire length of the U-shaped arm 55. Appropriate bearings for opposite ends of screw 59 are supplied at the top and base of U-shaped arm 55, and a knurled thumb nut 60 is pinned to screw 59. By moving thumb nut 60 it can be seen that block 58 will be caused to proceed upwardly or downwardly between the side members of the arm 55 in accordance with the direction of rotation of the screw 59. A clevis 61 straddles one side member of arm 55 and is pivotally secured to the block 58 by a pin 62. To the clevis 61 is secured a downwardly extending threaded rod 63 which is threaded into a turnbuckle sleeve 64. An oppositely threaded rod 65 is threaded into the opposite end of sleeve 64 and terminates in an eye 66. A pivot pin 67 pivotally secures the eye 66 to wheel 68 in an off center position and is spaced therefrom by a spacing washer 69. The wheel 68 is keyed to a shaft 70 which is anchored in an appropriate bearing in the camera housing 42 and through well-known gearing means is keyed to the intermittent film drive in such a manner that wheel 68 rotates a predetermined amount at the same time and with the intermittent movement of the film. Therefore the number of intermittent movements per rotation of wheel 68 represents the number of sets of focus or the focuses employing in making the film excepting that for one rotation of wheel 68 the stations between the extremes receive a set-up of focus twice for the same distance, one when arm 55 oscillates to the left and one when it oscillates back to the right. Therefore, for nine intermittent motions per revolution of the wheel 68 there would be involved five different focal distances and for ten intermittent motions per revolution of wheel 68 there would be involved six different focal distances. The ratio therefore of wheel 68 to the number of intermittent motions shall be such as best adapted to the type pictures being taken.

The two accessible and convenient hand adjustments provided are designed to aid the photographer in securing the best results for the given type of picture requirements. The operation of same will now be explained. There are two adjustments; namely, 60 and 64. Adjustment 60 determines the amplitude of oscillation of arm 55 and thereby limits the maximum and minimum distance over which the various focuses occur or the extent of the depth of the field taken into focus, and is termed amplitude. The adjustment 64 determines the range or distance from the lens the band including these field planes of focus occur. For instance, it might be adjusted for nearby scenes or for distant scenes.

In explanation of adjustment 60, when lug 58 is adjusted to a point near the top the connecting arm 63—64—65 reaches one extreme of amplitude at c—d and the other extreme of amplitude at c'—d' producing an angle of amplitude of d—O—d' while if lug 58 is adjusted so that it is at lower end of 55 then one extreme of amplitude is represented by the line a—b and the other extreme of amplitude is a'—b' subtending the angle of amplitude of b—o—b which is greater than the angle d—O—d'. Therefore the closer the lug 58 is to the lens the greater the ampltiude and the greater the depth over which the focus ranges.

It can readily be seen from Fig. 3 that by turning turnbuckle 64 and lengthening the arm 63—64—65 that the arm 55 will be forced to the right and that the range will be shifted to the greater focal distances while by shortening same the range will be shifted to the shorter focal distances.

From the foregoing description of method and apparatus it can be seen that my invention relates to the production of pictures suitable for the interpretation of depth or third dimension as well as the appearance of naturalness whether viewed with one eye or both eyes because the same operation produced in my invention are common in everyday natural vision. It is seen that the focusing of the eye, be it ever so rapid, can be performed by the camera upon displacement pictures. Therefore it is the purpose of this invention to cover the field for methods and apparatus necessary to record any series of pictures where various pictures are taken at various focal distances and flashed in sequence or superimposed for viewing.

While I have shown and described my preferred method and preferred construction I do not wish to be limited to the details shown herein but wish to avail myself of any and all variations coming within the scope of the appended claims.

Having thus described my invention what I claim as new and desire to secure by Letters Patent is:

1. In a motion picture camera having a main lens and mount therefor and a film drive, apparatus for varying the focus of said main lens in synchronization with the operation of said film drive, said means comprising an arm operatively attached to said main lens mount and adapted, when moved, to vary the focus of said main lens, a block adjustably connected to said arm, a rotatable member arranged to be rotated by said film drive, a connecting rod pivotally connected eccentrically to said rotatable member and at its opposite end to said block, and means for varying the position of said block on said arm.

2. In a motion picture camera having a main lens and mount therefor and a film drive, apparatus for varying the focus of said main lens in synchronization with the operation of said film drive, said means comprising an arm operatively attached to said main lens mount and adapted, when moved, to vary the focus of said main lens, a block adjustably connected to said arm, a rotatable member arranged to be rotated by said film drive, a connecting rod pivotally connected eccentrically to said rotatable member and at its opposite end to said block, means for varying the position of said block on said arm, and turnbuckle means in said connecting rod for varying the effective length thereof.

3. In a motion picture camera having a main lens and mount therefor and a film drive, apparatus for varying the focus of said main lens in synchronization with the operation of said film drive, said means comprising an arm operatively attached to said main lens mount and adapted, when moved, to vary the focus of said main lens, a block adjustably connected to said arm, a rotatable member arranged to be rotated by said film drive, a connecting rod pivotally connected eccentrically to said rotatable member and at its opposite end to said block, and a rotatable member for varying the position of said block relative to said arm.

ALLEN L. BARNES.